United States Patent
Mizobata

(10) Patent No.: US 9,550,438 B2
(45) Date of Patent: *Jan. 24, 2017

(54) HEADRESTS AND VEHICLE SEATS HAVING THE SAME

(71) Applicant: TOYOTA BOSHOKU KABUSHIKI KAISHA, Aichi-ken (JP)

(72) Inventor: Hiroshi Mizobata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/302,787

(22) Filed: Jun. 12, 2014

(65) Prior Publication Data

US 2014/0368008 A1 Dec. 18, 2014

(30) Foreign Application Priority Data

Jun. 18, 2013 (JP) ................................ 2013-127467

(51) Int. Cl.
- *B60N 2/42* (2006.01)
- *B60N 2/48* (2006.01)
- *B60N 2/427* (2006.01)

(52) U.S. Cl.
CPC ............ *B60N 2/427* (2013.01); *B60N 2/4228* (2013.01); *B60N 2/4808* (2013.01); *B60N 2205/30* (2013.01)

(58) Field of Classification Search
CPC ..................................................... B60N 2/427

(Continued)

(56) References Cited

U.S. PATENT DOCUMENTS 3,680,912 A * 8/1972 Matsuura ............. B60N 2/4838
297/216.12
6,550,856 B1 * 4/2003 Ganser et al. .................. 297/61
(Continued)

FOREIGN PATENT DOCUMENTS

CN 102848950 1/2013
EP 0 677 423 10/1995
(Continued)

OTHER PUBLICATIONS

Official Action, along with English-language translation thereof, for JP Appl. No. 2013-127467 dated Aug. 30, 2016.
(Continued)

*Primary Examiner* — Timothy J Brindley
(74) *Attorney, Agent, or Firm* — Greenblum & Bernstein, P.L.C.

(57) ABSTRACT

Embodiments of the present invention may include a vehicle seat having a seatback and a headrest. The headrest has a first headrest portion, a second headrest portion and a headrest cover. The first headrest portion is connected to the seatback. The second headrest portion is provided nearer to a user seated in the seat than the first headrest portion. The second headrest portion is provided on the first headrest portion so as to be vertically movable. The headrest cover covers the first headrest portion and the second headrest portion. The headrest cover includes an elastic region. When the second headrest portion moves vertically with respect to the first headrest portion, the elastic region is deformed so as to allow movement of the second headrest portion.

13 Claims, 16 Drawing Sheets

(58) Field of Classification Search
USPC .................................. 297/216.12, 410, 221
See application file for complete search history.

(56) References Cited

U.S. PATENT DOCUMENTS

| | | | |
|---|---|---|---|
| 7,048,334 B2* | 5/2006 | Pal et al. | 297/216.12 |
| 7,048,336 B2* | 5/2006 | Mawbey et al. | 297/408 |
| 7,201,448 B2* | 4/2007 | Williamson et al. | 297/407 |
| 7,798,570 B2* | 9/2010 | Kwiecinski et al. | 297/216.12 |
| 8,616,633 B2* | 12/2013 | Truckenbrodt et al. | 297/216.12 |
| 2001/0026092 A1* | 10/2001 | Robinson | 297/410 |
| 2002/0043860 A1* | 4/2002 | Dinkel et al. | 297/410 |
| 2004/0160107 A1* | 8/2004 | Steinle et al. | 297/410 |
| 2005/0168020 A1* | 8/2005 | Yetukuri et al. | 297/216.12 |
| 2006/0071518 A1* | 4/2006 | Hippel et al. | 297/216.12 |
| 2006/0170271 A1* | 8/2006 | Coccoli | 297/410 |
| 2008/0272631 A1* | 11/2008 | Hartlaub | 297/216.12 |
| 2008/0315636 A1* | 12/2008 | Yetukuri et al. | 297/216.12 |
| 2009/0200851 A1* | 8/2009 | Link | 297/409 |
| 2009/0309405 A1* | 12/2009 | Maciejczyk | 297/391 |
| 2010/0026061 A1* | 2/2010 | McFalls et al. | 297/216.12 |
| 2010/0109396 A1* | 5/2010 | Vitali | 297/216.12 |
| 2013/0001989 A1 | 1/2013 | Bell et al. | |
| 2014/0339864 A1* | 11/2014 | Mizobata | 297/216.12 |

FOREIGN PATENT DOCUMENTS

| | | |
|---|---|---|
| JP | 8-47434 | 2/1996 |
| JP | 2000-6751 | 1/2000 |
| JP | 2008-149862 | 7/2008 |

OTHER PUBLICATIONS

Official Action, including English-language translation thereof, for CN Appl. No. 201410272887 having an issuance date of Dec. 29, 2015.

* cited by examiner

HEADRESTS AND VEHICLE SEATS HAVING THE SAME

This application claims priority to Japanese patent application serial number 2013-127467, the contents of which are incorporated herein by reference.

BACKGROUND OF THE INVENTION

Field of the Invention

Embodiments of the present invention relate to vehicle seats. More specifically, the embodiments relate to vehicle seats having a headrest that has a portion facing the head of a user which is movable in the vertical direction.

Description of the Related Art

A conventional vehicle seat has a headrest supporting a head of a user. A pad exhibiting an adequate elastic force is packed into the headrest. When, for example, a vehicle is hit from behind (rearward collision), the headrest assuredly supports the head of the user seated in the seat.

A rearward collision may be of various types. For example, in a first type of collision, the user is pressed backwards as shown in FIGS. 13 to 16, and then his body moves upwards. In a second type of collision, the user is pressed backwards as shown in FIGS. 17 to 21, and then his body moves downwards. In a third type of collision, his body moves upwards first, and then moves downwards.

In the case of the first type of collision, the head of the user is supported by the pad of the headrest. However, when his body moves upwards, the head receives a backward rotational force (as indicated by the arrow Rc in FIG. 15). As a result, the user may sustain a whiplash injury. In the case of the second type of collision, the head of the user is supported by the pad of the headrest. However, due to the downward movement of his body, his head receives a forward rotational force (as indicated by the arrow Rd in FIG. 20). As a result, the user may sustain a whiplash injury.

Japanese Laid-Open Patent Publication No. 2008-149862 discloses a technique in which there is provided a tension spring for biasing a movable headrest. The headrest is retained in a position where the headrest is under a biasing force. When a sensor predicts a rearward collision, the biasing force of the tension spring is released by using a solenoid. As a result, the movable headrest moves instantaneously upwards. The headrest moves upwards not at the instant that the rearward collision occurs but at the instant that the rearward collision is predicted. Thus, there is the possibility that the upward movement of the headrest does not coincide with the upward movement of the body of the user.

As a result, in some cases, it is impossible to effectively suppress the backward rotation of the head of the user. The movement distance of the headrest is fixed. Thus, even when the movement of the headrest coincides with the movement of the body, the movement distance of the headrest may be excessive or deficient. As a result, in some cases, it is impossible to sufficiently suppress the backward rotation of the head of the user. In the case where the body of the user moves downwards at the time of collision, ascent of the headrest may aggravate the forward rotation of the head further. A conventional headrest requires a complicated structure for its movement.

Thus, there has been a need for a headrest capable of further reducing burden on a user's neck when the user's body moves at the time of rearward collision. It is more desirable for the headrest to be simple.

SUMMARY OF THE INVENTION

According to an aspect of the invention, certain embodiments of the present invention include a vehicle seat having a seatback and a headrest. The headrest has a first headrest portion, a second headrest portion and a headrest cover. The first headrest portion is connected to the seatback. The second headrest portion is provided nearer to a user seated in the seat than the first headrest portion. The second headrest portion is provided on the first headrest portion so as to be vertically movable. The headrest cover covers the first headrest portion and the second headrest portion. The headrest cover includes an elastic region. When the second headrest portion moves vertically with respect to the first headrest portion, the elastic region is deformed so as to allow movement of the second headrest portion.

When rearward collision or the like occurs, the head of the user abuts the second headrest portion. When the head moves vertically, the head hits the second headrest portion with vertical force. Thereafter, the second headrest portion moves in the vertical direction. Then, the elastic region of the headrest cover is elastically deformed. In this way, it is possible to mitigate the whiplash injury of the user.

The movement amount of the second headrest portion is determined by the magnitude of the shock of the rearward collision and the magnitude of the elastic force of the headrest cover. When the shock is great, the movement amount is large. When the shock is small, the movement amount is small. Thus, the second headrest portion moves substantially simultaneously with the head of the user. As a result, it is possible to reduce the occurrence of whiplash injury to the user. When the force that has been imparted to the second headrest portion is released, the second headrest portion is restored to an initial position (use position) by the elastic force of the elastic region of the headrest cover. Thus, it is possible to repeatedly use the headrest. By utilizing the elastic force of the headrest cover, it is possible for the headrest to restore the second headrest portion to the use position with a small number of components.

According to another aspect of the invention, the headrest cover may have a cover rear surface, a cover front surface and a connection portion. The rear surface covers the first headrest portion. The cover front surface covers the second headrest portion. The connection portion connects the cover rear surface and the cover front surface. The connection portion may have the elastic region at a part thereof or over the entire area thereof.

According to another aspect of the invention, the elastic region may be astride a boundary between the first headrest portion and the second headrest portion. Thus, when the second headrest portion makes a relative movement with respect to the first headrest portion, the elastic region can effectively be elastically deformed.

According to another aspect of the invention, the headrest further may include an elastic member. The elastic member connects the first headrest portion and the second headrest portion. The elastic member undergoes elastic deformation when the second headrest portion moves with respect to the first headrest portion. Thus, due to the elastic force of the elastic region of the headrest cover and of the elastic member, the second headrest portion can be restored to the use position. It can happen that, for example, the elastic force of the elastic region of the headrest cover deteriorates as a result of long-term use. Even in such a case, the second headrest portion can be maintained at the use position due to the elastic force of the elastic member.

According to another aspect of the invention, the elastic member may be situated in a region covered by the headrest cover.

DETAILED DESCRIPTION OF THE INVENTION

Figure 1:
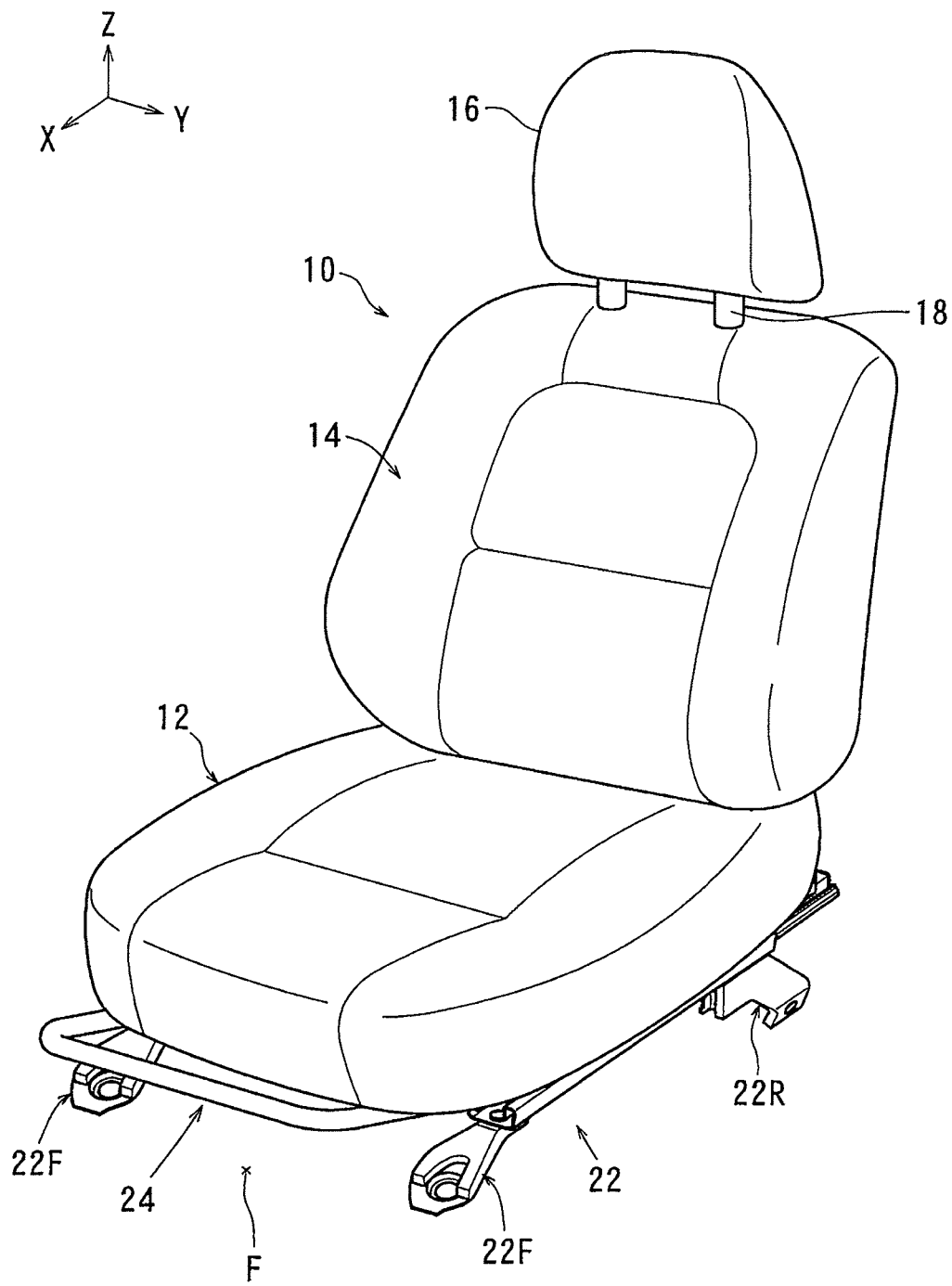
FIG. 1 is a perspective view of a vehicle seat.

Each of the additional features and teachings disclosed above and below may be utilized separately or in conjunction with other features and teachings to provide improved vehicle seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

An embodiment of the present invention will be described with reference to the drawings. Symbols X, Y, and Z respectively indicate the front side, the left-hand side, and the upper side. The front side corresponds to the side that comes into sight of a user P seated in a seat 10. The rear side is the side which is opposite of the user's P direct line of sight.

The vehicle seat 10 has a headrest 16, a seatback 14 and a seat cushion 12. The headrest 16 mainly supports the head PH of the user P. The seatback 14 mainly supports a body PB of the user P. The user P is seated in the seat cushion 12. The seatback 14 is connected to the seat cushion 12 by a reclining mechanism (not shown) so as to allow reclining of the seat.

The vehicle seat 10 is provided with a slide device 22 allowing longitudinal movement with respect to the floor F of the vehicle. The slide device 22 is fixed to the floor F by mounting brackets 22F and 22R. By operating an operation lever 24, the user P can longitudinally move the seat cushion 12, etc. By releasing the operation lever 24, it is possible to fix the seat cushion 12, etc. in a desirable position.

The headrest 16 is arranged on top of headrest stay 18. The headrest stay 18 is fixed to the seatback 14.

The seatback 14 has a back frame (not shown). The back frame has an upper frame situated in the upper portion thereof. Two tubular first holders (not shown) are arranged in parallel on the upper frame. Each second holder is inserted into each of the first holders. Each headrest support (not shown) is fixed to each of the second holders. The headrest stay 18 is inserted into each of the headrest supports. The headrest supports support the headrest 16 via the headrest stay 18 so as to allow adjustment of the height of the headrest 16.

The seatback 14 has a back pad (not shown) and a seat cover. The back pad is mounted on the back frame and situated between the back frame and the user P sitting in the seat 10. The seat cover is mounted to the back pad so as to press the back pad against the back frame. Like the seat back 14, the seat cushion 12 has a cushion frame (not shown), a cushion pad (not shown) and a seat cover. The vehicle seat 10 is provided in a vehicle such as a car.

The headrest 16 has a headrest pad 26 and a headrest cover 28. The headrest pad 26 is mounted to the headrest stay 18 so as to surround the upper portion of the headrest stay 18. The headrest cover 28 covers the headrest pad 26. The headrest pad 26 is formed, for example, of a urethane pad.

Figure 2:
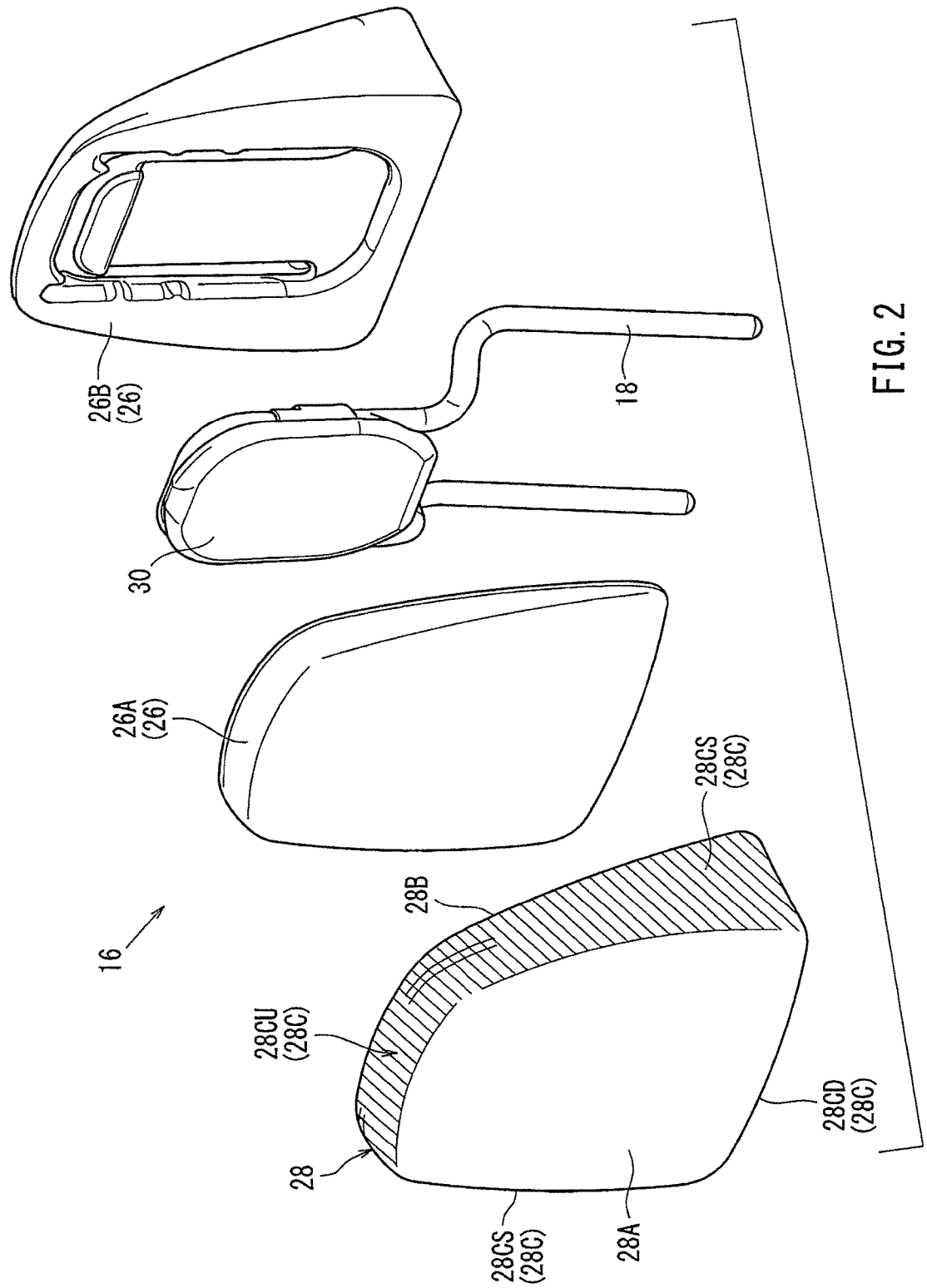
FIG. 2 is an expanded perspective view of a headrest.
Figure 3:
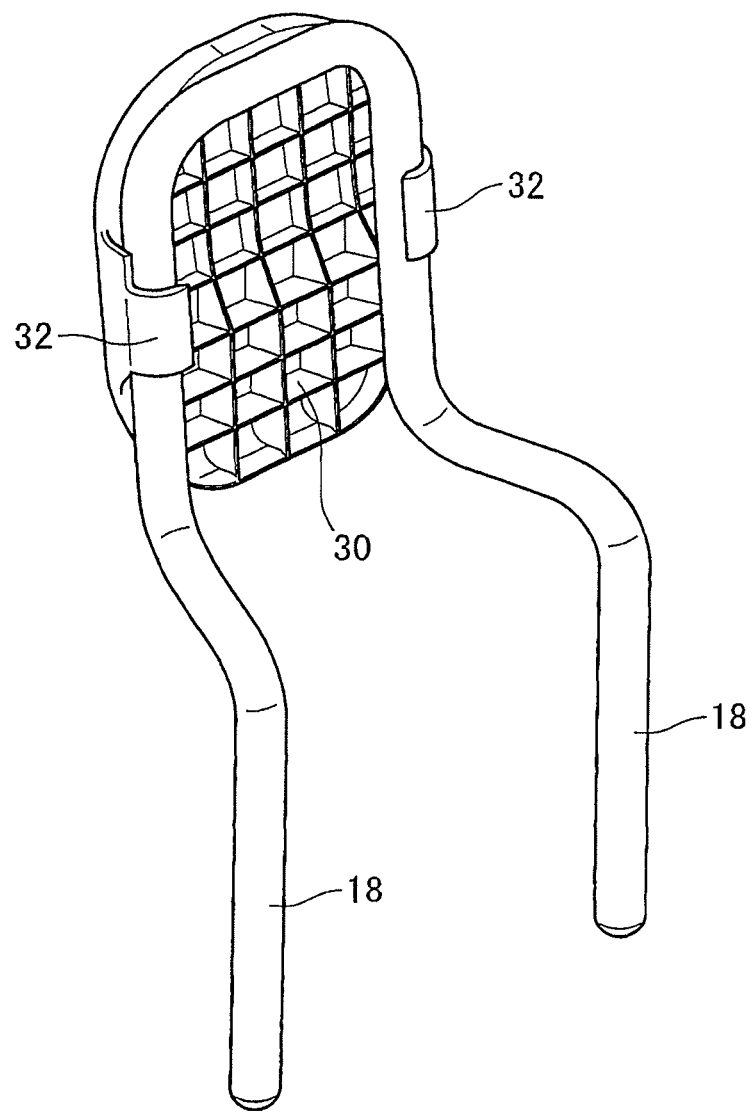
FIG. 3 is a perspective view of a headrest stay with a support member from the rear.
Figure 7:
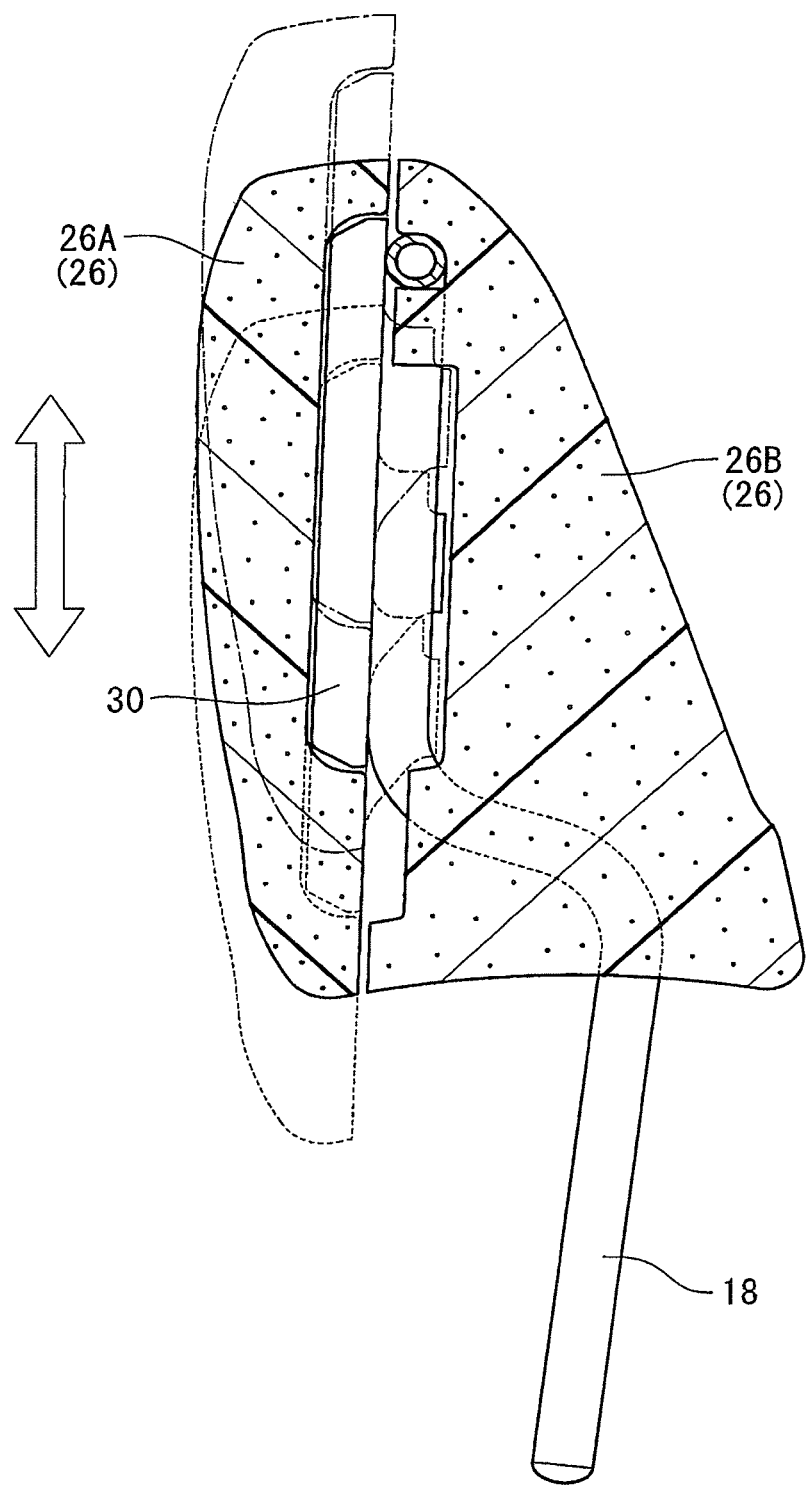
FIG. 7 is a cross-sectional view taken along line VII-VII in FIG. 5.

As shown in FIG. 2, the headrest pad 26 is vertically divided into a front pad 26A and a rear pad 26B. As shown in FIG. 7, the headrest stay 18 has a bent portion bent backwards from the upper portion. The rear pad 26B is mounted to the headrest stay 18 while fitted into the bent portions. The front pad 26A is arranged nearer to the head PH of the user P than the rear pad 26B. The front pad 26A is mounted to the headrest stay 18 via a support member (e.g., a resin plate) 30. The support member 30 is movably attached to the headrest stay 18. Thus, the front pad 26A is movable in the vertical direction with respect to the rear pad 26B.

Figure 4:
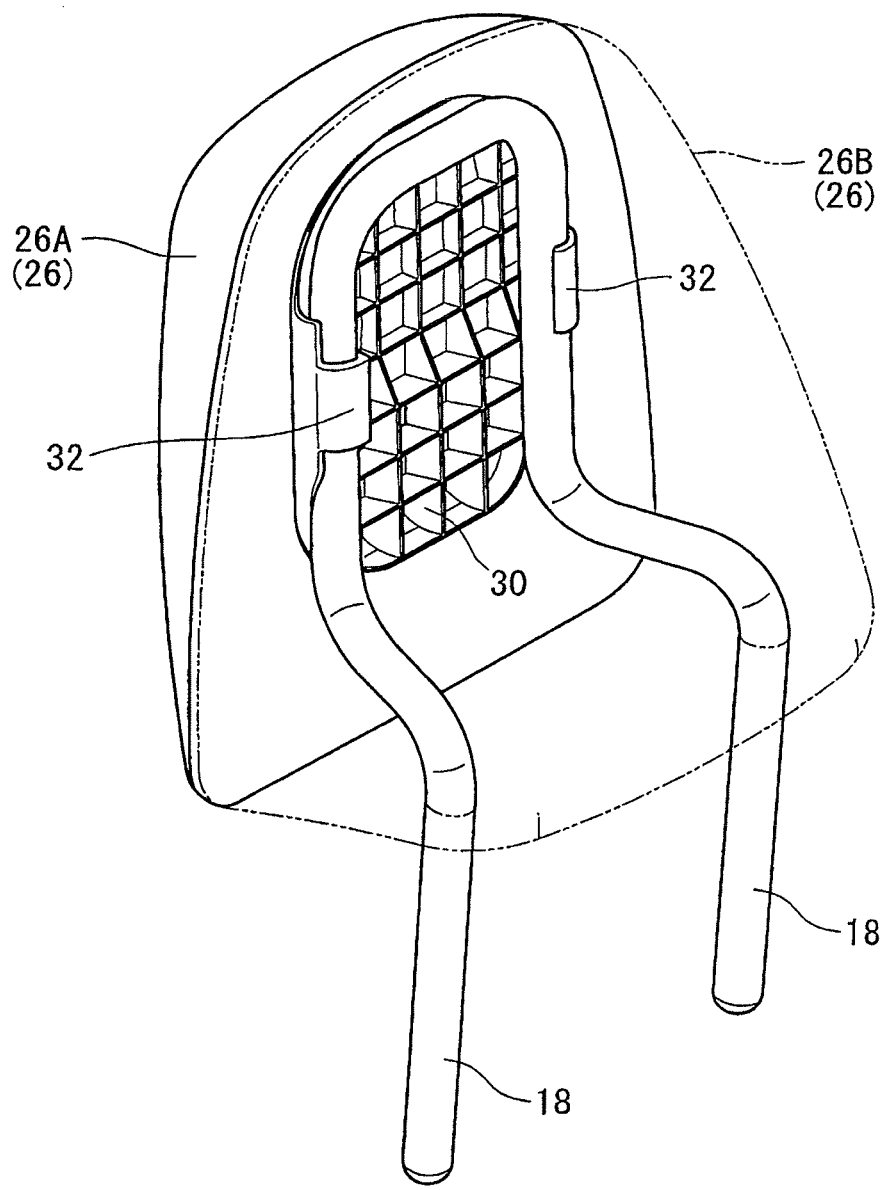
FIG. 4 is a perspective view of the headrest stay, the support member and a front pad.
Figure 5:
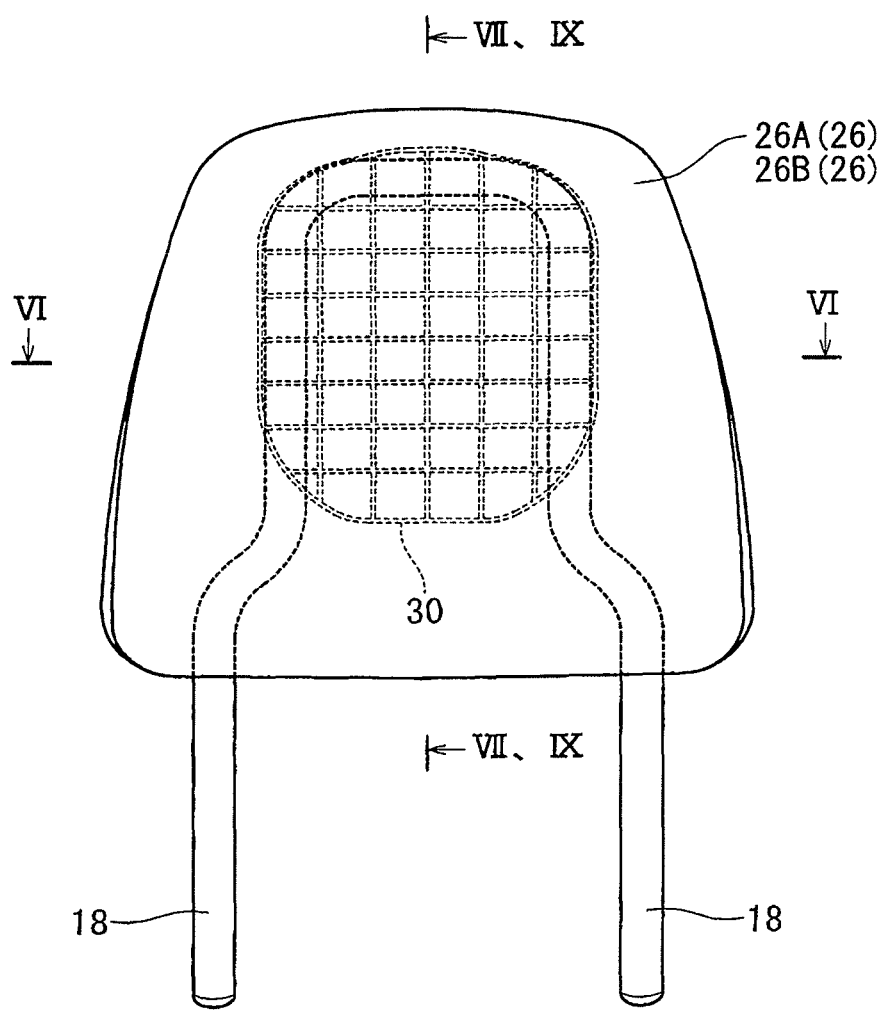
FIG. 5 is a front view of the front pad, a rear pad and the headrest stay.
Figure 6:
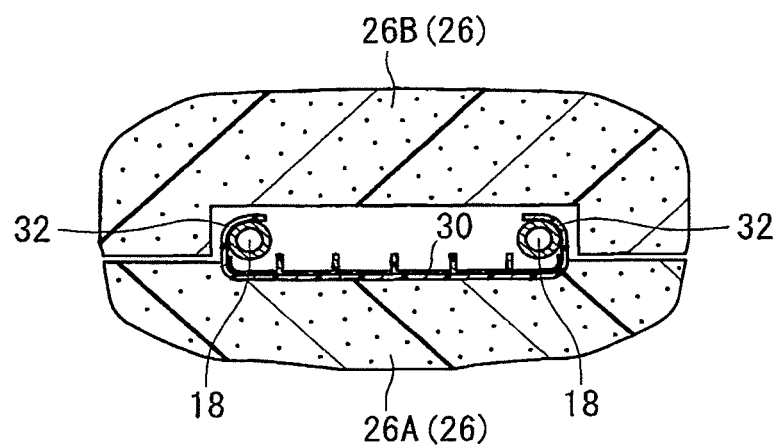
FIG. 6 is a cross-sectional view taken along line VI-VI in FIG. 5.

As shown in FIGS. 4 to 6, the support member 30 is mounted to the front pad 26A. A front face of the support member 30 is embedded in a rear portion of the front pad 26A. The support member 30 has right and left grasping portions 32 grasping the headrest stay 18. The grasping portions 32 have a curved shape surrounding the headrest stay 18 from the rear. The grasping portions 32 are mounted to the headrest stay 18 so as to be movable along the headrest stay 18. As shown in FIGS. 2 and 6, the rear pad 26B has a concave portion at a front portion thereof. The upper portion of the headrest stay 18 and the grasping portions 32 are located in the concave of the rear pad 26B.

As indicated by a dotted line and a dashed-dotted line of FIG. 7, the front pad 26A is movable in the vertical direction with respect to the rear pad 26B. The headrest 16 has a first headrest portion including the rear pad 26B and a second headrest portion including the front pad 26A and the support member 30. The second headrest portion is movable with respect to the first headrest portion.

As shown in FIG. 2, the headrest pad 26 has a front pad 26A and a rear pad 26B. The headrest pad 26 is covered with the headrest cover 28. The headrest cover 28 has a cover front surface 28A, a cover rear surface 28B and a connection portion 28C. The cover front surface 28A covers a front surface of the front pad 26A. The cover rear surface 28B covers a rear surface of the rear pad 26B. The connection portion 28C covers an outer circumference of the headrest pad 26.

The connection portion (elastic region) 28C connects the cover front surface 28A and the cover rear surface 28B. FIG. 2 indicates the connection portion 28C as the shaded portion. The connection portion 28C has side surfaces 28CS, an upper surface 28CU and a lower surface 28CD. The side surfaces 28CS extend between the sides of the cover front surface 28A and the sides of the cover rear surface 28B. The upper surface 28CU extends between the upper end of the cover front surface 28A and the upper end of the cover rear surface 28B. The lower surface 28CD extends between the lower end of the cover front surface 28A and the lower end of the cover rear surface 28B.

The cover front surface 28A and the cover rear surface 28B are formed, for example, of cloth. The connection portion 28C is formed of a material which undergoes elastic deformation. The connection portion 28C is more easily deformed than the cover front surface 28A and the cover rear surface 28B. For example, the connection portion 28C is formed of a rubber material or the like, and is expandable.

Figure 8:
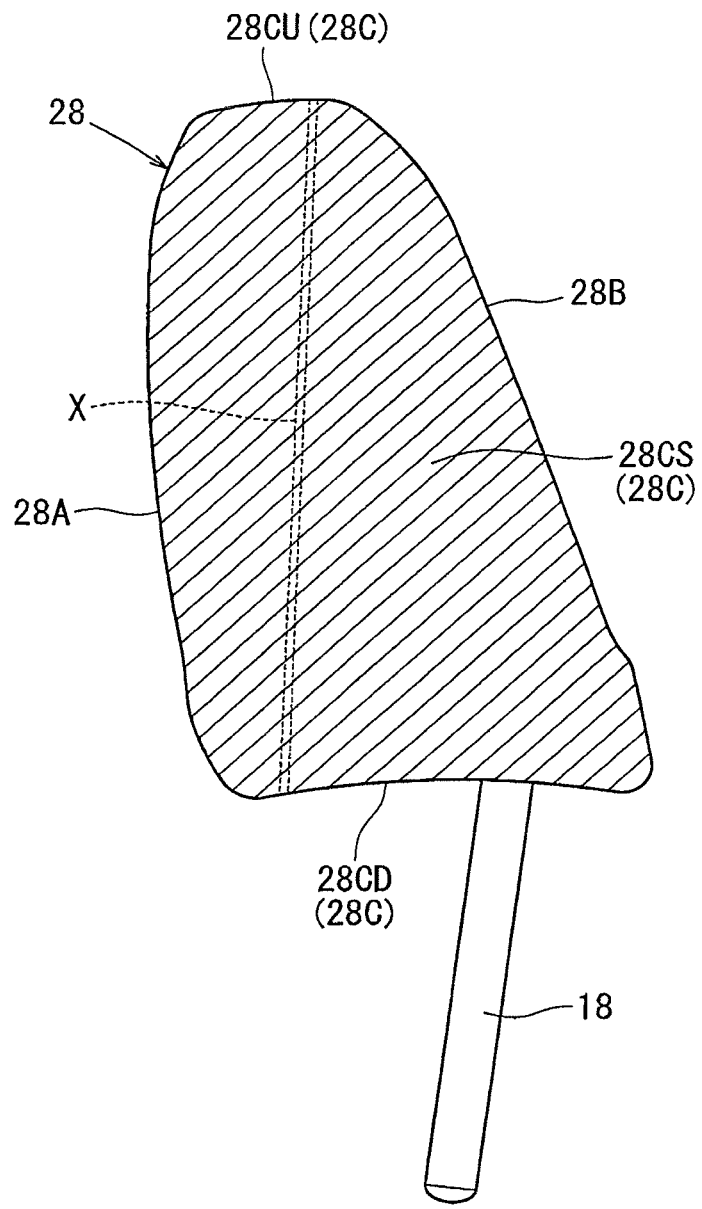
FIG. 8 is a side view of the headrest covered by a headrest cover.

The shaded portion in FIG. 8 indicates the connection portion 28C of the headrest cover 28. In FIG. 8, symbol X indicates the interface between the rear surface of the front pad 26A and the front surface of the rear pad 26B. The connection portion 28C covers the interface X. The connection portion 28C extends astride the first headrest portion (front pad 26A) and the second headrest portion (rear pad 26B). The interface X is substantially perpendicular to the horizontal line. The connection portion 28C is formed of a skin material capable of elastic deformation. Thus, due to the expansion of the connection portion 28C, the front pad 28A can move in the vertical direction as shown in FIG. 7. After the front pad 26A receives an external force, it moves vertically. Thereafter, the external force is released and the connection portion 28C contracts. As a result, the front pad 26A is restored to the use position (indicated by the solid line in FIG. 7).

The headrest cover 28 has a bag-like shape formed by sewing together the cover front surface 28A, the cover rear surface 28B and the connection portion 28C. The lower surface 28CD of the connection portion 28C can be opened. The headrest pad 26 may be wrapped around headrest cover 28. Then, the lower surface 28CD is closed by using a face fastener or the like.

At the time of rearward collision of the vehicle, the head PH of the user P is angled backwards due to the shock. The head PH is forced against the front surface of the headrest 16. When the head PH of the user P moves upwards as a result of the shock, the front pad 26A makes a relative upward movement with respect to the rear pad 26B. When the head PH of the user P moves downwards as a result of the shock, the front pad 26A makes a relative downward movement with respect to the rear pad 26B.

The elastic deformation of the connection portion 28C allows the vertical movement of the front pad 26A. Thus, it is possible to reduce the occurrence of a whiplash injury to the neck of the user P at the time of collision. The movement amount in the vertical direction of the front pad 26A is determined by the magnitude of the shock and by the elastic force of the connection portion 28C. When the shock is of a small magnitude, the movement amount is small. When the shock is of a large magnitude, the movement amount is large.

As a result of the shock, the head PH of the user P moves, and the head PH moves the front pad 26A in the vertical direction. When the head PH stops, the front pad 26A is restored to the use position due to the elastic force of the connection portion 28C. As a result, it is possible to use the headrest 16 repeatedly.

Figure 9:
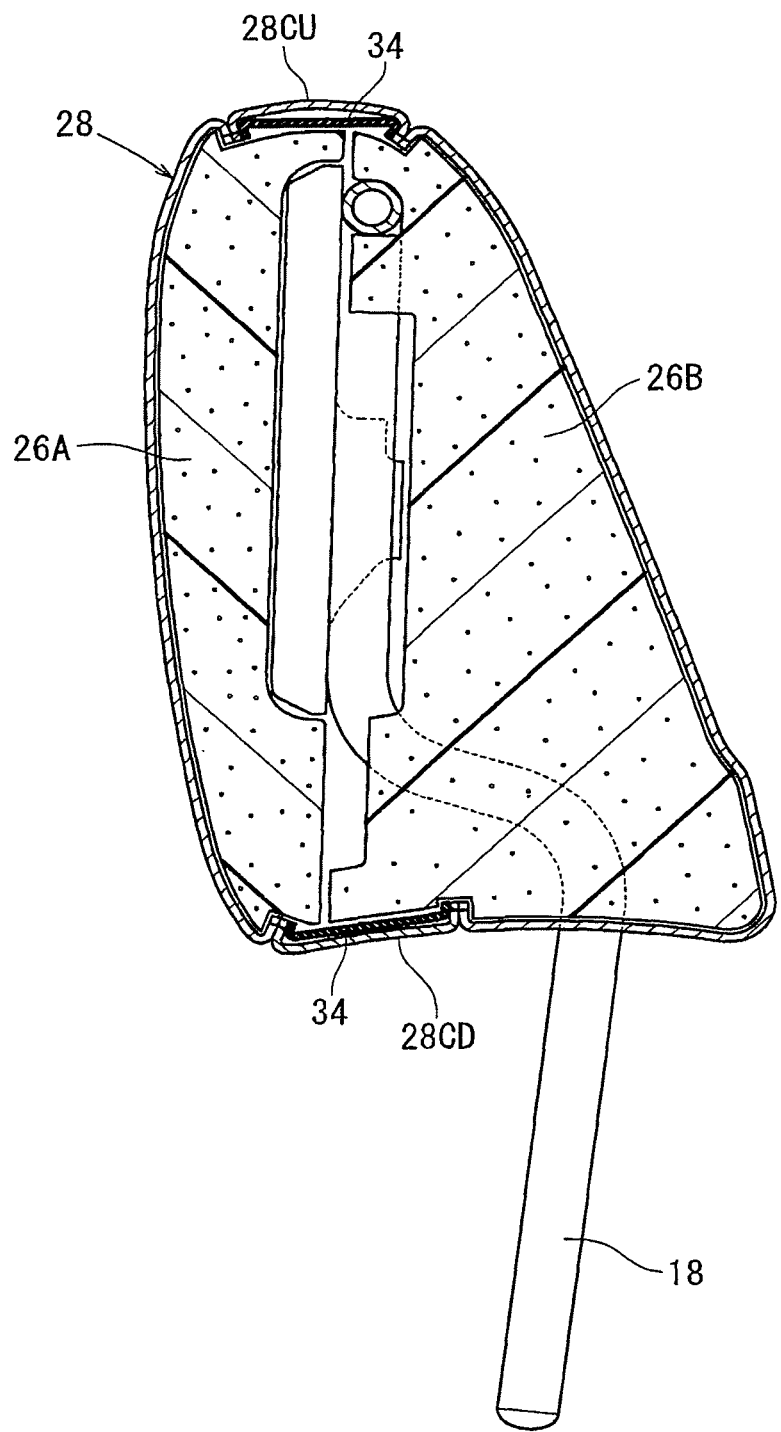
FIG. 9 is a cross-sectional view of another configuration further having auxiliary elastic members, corresponding to FIG. 7.

As shown in FIG. 9, the headrest cover 28 may have auxiliary elastic members 34. The auxiliary elastic members 34 consist of elastic members such as rubber bands or springs. The auxiliary elastic members 34 are provided inside the connection portion 28C. The front and rear edges of the upper surface 28CU and the lower surface 28CD of the connection portion 28C are sewn to the cover front surface 28A and the cover rear surface 28B, respectively. At the time of the sewing, the elastic members 34 are sewn to the front and rear edges of the upper surface 28CU and the lower surface 28CD. The auxiliary elastic members 34 supplement the elastic force of the connection portion 28C. Thus, when the elastic function of the connection portion 28C deteriorates as a result of long-term use, the auxiliary elastic members 34 may maintain the front pad 26A at the use position.

Figure 10:
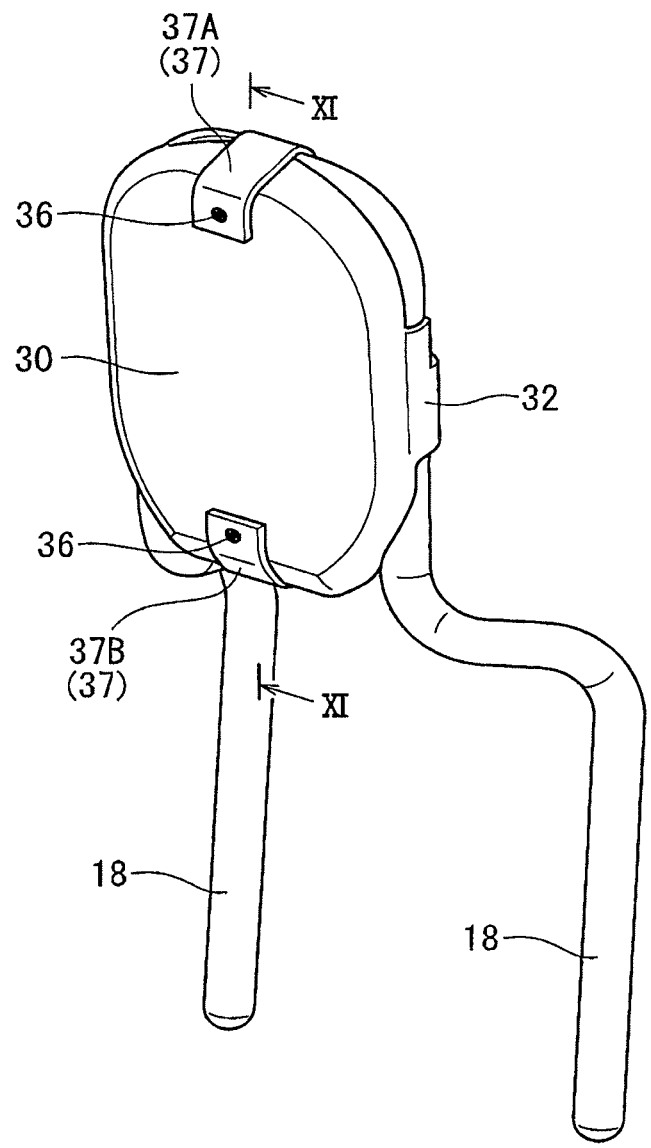
FIG. 10 is a perspective view of another configuration having auxiliary elastic members between the support member and the headrest stay.
Figure 11:
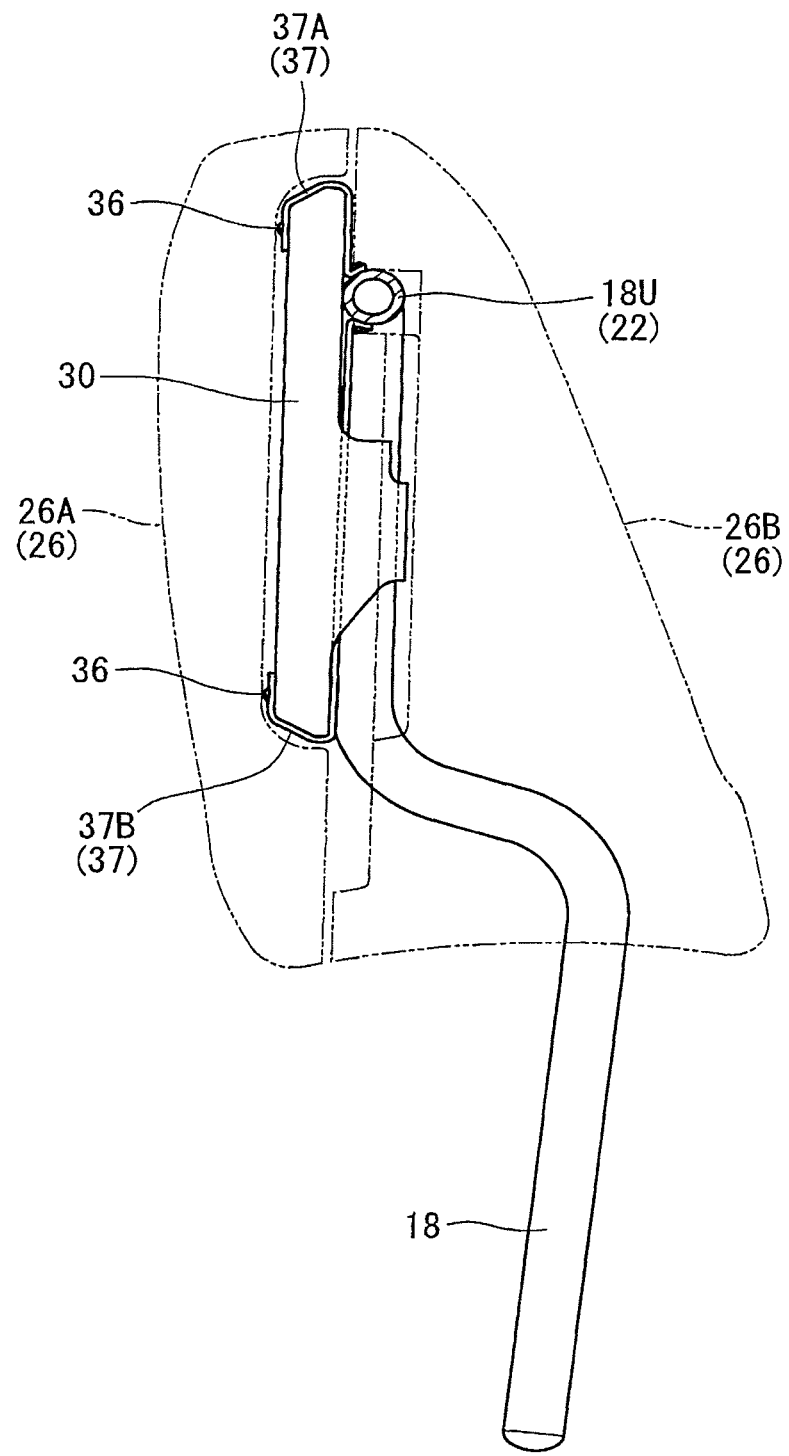
FIG. 11 is a cross-sectional view taken along line XI-XI in FIG. 10.
Figure 12:
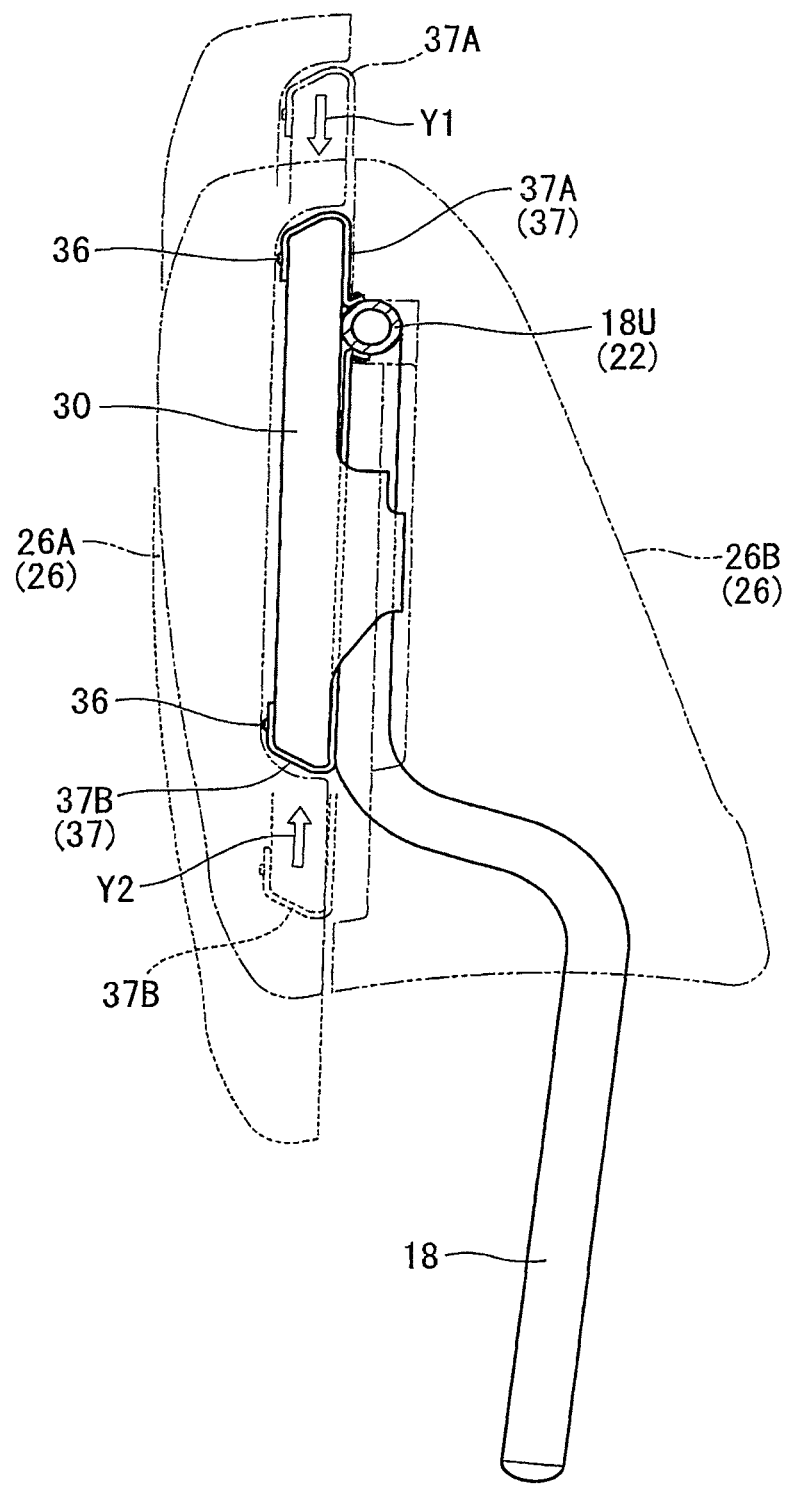
FIG. 12 is a cross-sectional view for showing the movement of the auxiliary elastic members of FIG. 11.

Instead of the auxiliary elastic members 34 shown in FIG. 9, the headrest may have auxiliary elastic members 37 as shown in FIGS. 10 to 12. As shown in FIGS. 10 to 12, the auxiliary elastic members 37 are elastic members such as rubber bands, and may include an upper rubber band 37A and a lower rubber band 37B. The upper rubber band 37A sits astride the upper end of the support member 30. One end of the upper rubber band 37A is fixed to an upper portion 18U of the headrest stay 18. The other end of the upper rubber band 37A is fixed to the upper portion of the front surface of the support member 30 by a screw 36. The lower rubber band 37B sits astride the lower end of the support member 30. One end of the lower rubber band 37B is fixed to the upper portion 18U of the headrest stay 18. The other end of the lower rubber band is fixed to the lower, portion of the front surface of the support member 30 by a screw 36.

As shown in FIG. 12, when the front pad 26A and the support member 30 move integrally upwards, the upper rubber band 37A expands, and an elastic force indicated by the arrow Y1 is exerted. When the front pad 26A and the support member 30 move together downwards, the upper rubber band 37B expands, and an elastic force indicated by the arrow Y2 is exerted. Thus, the front pad 26A is restored to the use position due to the elastic force of the connection portion 28C and the auxiliary elastic force of the auxiliary elastic members 37.

Figure 13:
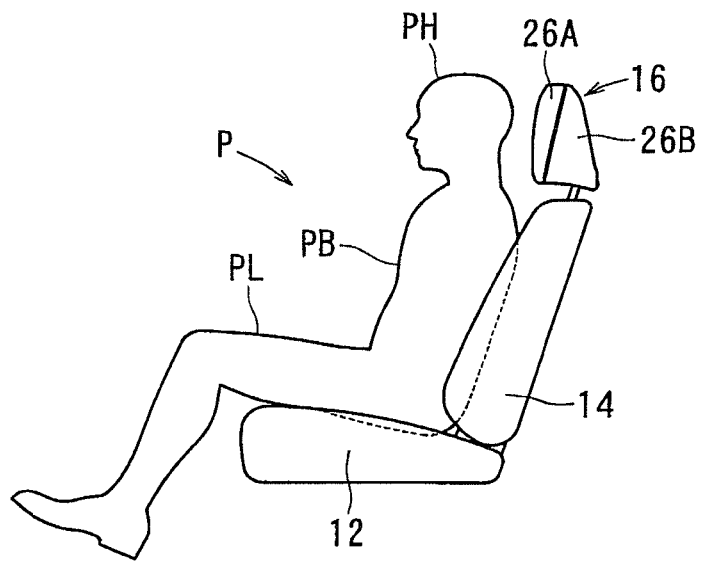
FIG. 13 is a side view of the vehicle seat and a user in a normal state.
Figure 14:
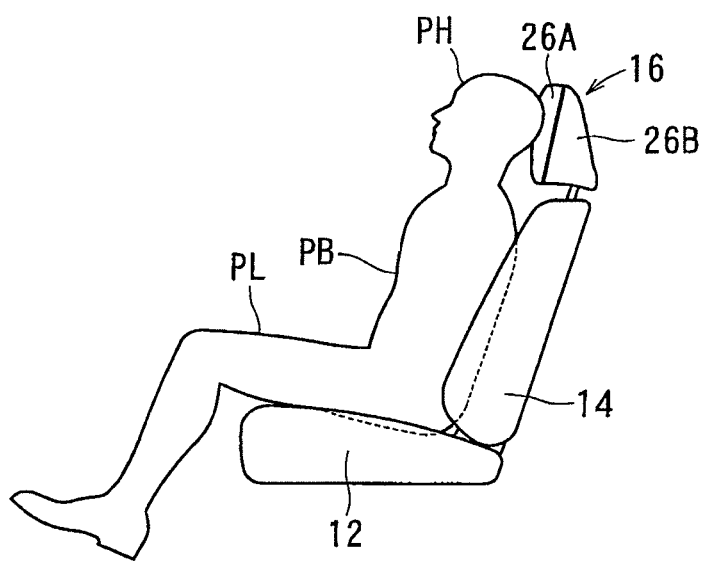
FIG. 14 is a side view of the vehicle seat and the user at the time of rearward collision.
Figure 15:
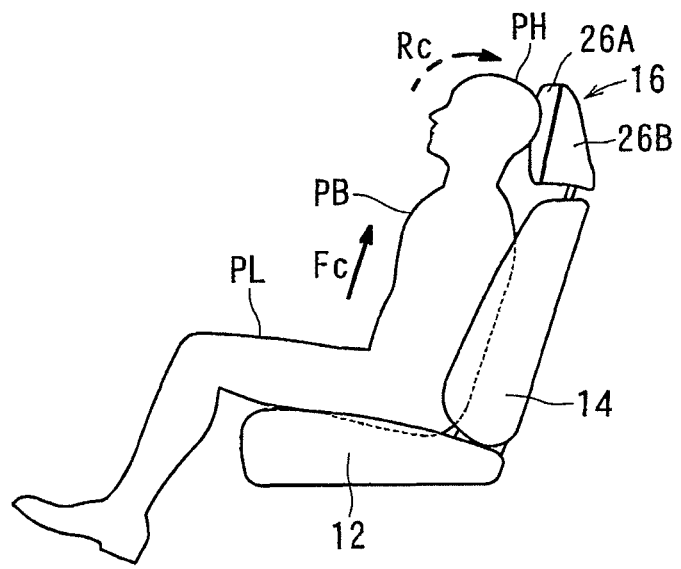
FIG. 15 is a side view of the vehicle seat and the user for showing upward force applied on the user at the time of the rearward collision.
Figure 16:
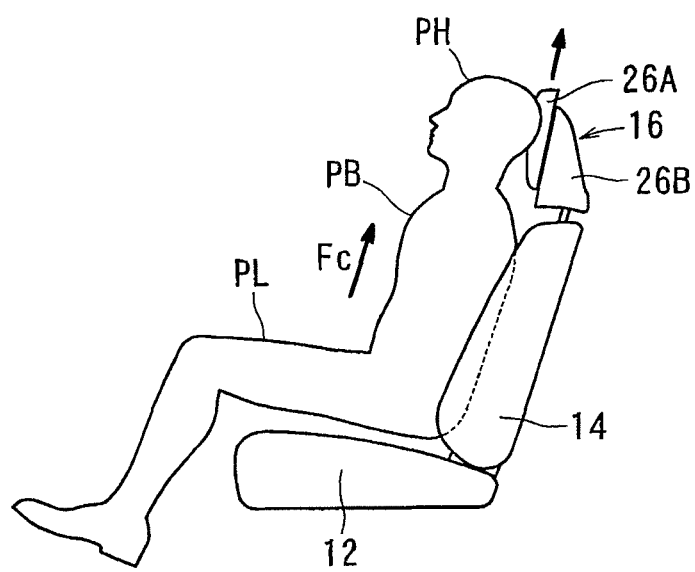
FIG. 16 is a side view of the vehicle seat and the user when the user moves upwards at the time of the rearward collision.

As shown in FIG. 13, the head PH of the user P is normally spaced away from or slightly in contact with the headrest 16. As shown in FIG. 14, when rearward collision occurs, the head PH moves backwards, and is pressed against the front pad 26A. As shown in FIGS. 15 and 16, when rearward collision occurs, the body PB of the user P may receive an upward force Fc. The body PB moves upwards while the head PH is being pressed against the front pad 26A.

If the front pad 26A cannot move as in the prior art, the head PH receives a force Rc and rotates backwards. Thus, a large force may be applied to the neck of the user P. In contrast, the front pad 26A can move with respect to the rear pad 26B. When the body PB moves upwards, the head PH moves upwards together with the front pad 26A. Thus, it is possible to suppress the phenomenon in which the head PH is caused to rotate backwards by the force Rc. As a result, it is possible to suitably suppress the occurrence a of whiplash injury with respect to the user P.

Figure 17:
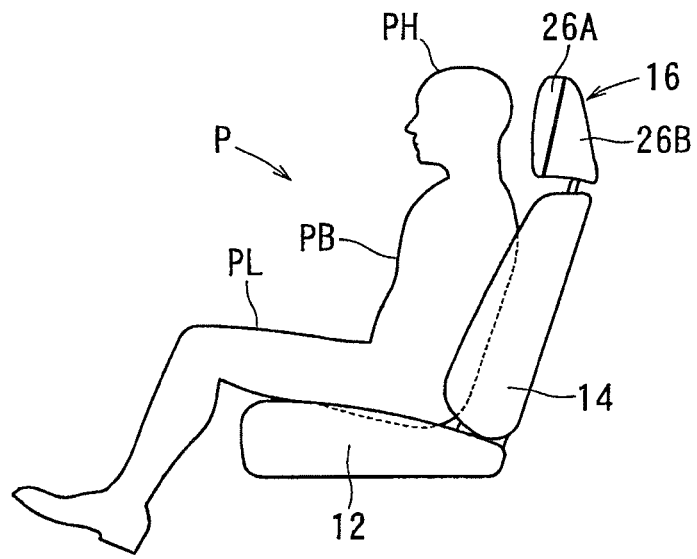
FIG. 17 is a side view of the vehicle seat and the user in the normal state.
Figure 18:
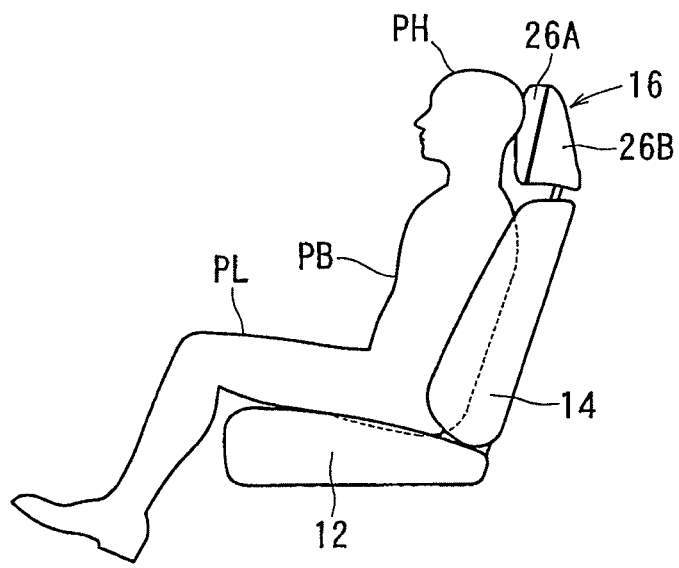
FIG. 18 is a side view of the vehicle seat and the user at the time of rearward collision.
Figure 19:
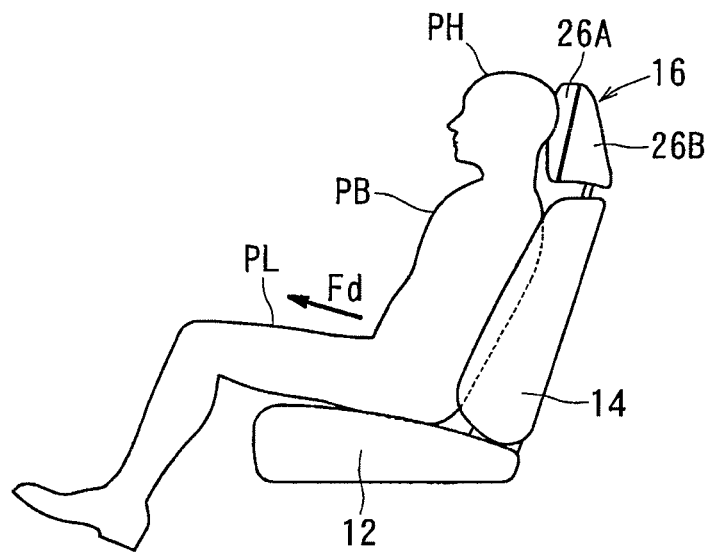
FIG. 19 is a side view of the vehicle seat and the user for showing forward force applied on the user at the time of the rearward collision.
Figure 20:
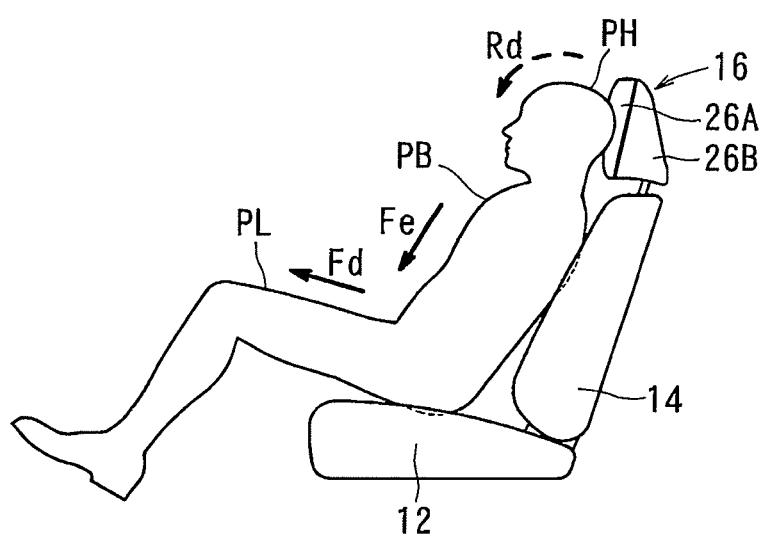
FIG. 20 is a side view of the vehicle seat and the user when the user moves downwards at the time of the rearward collision.
Figure 21:
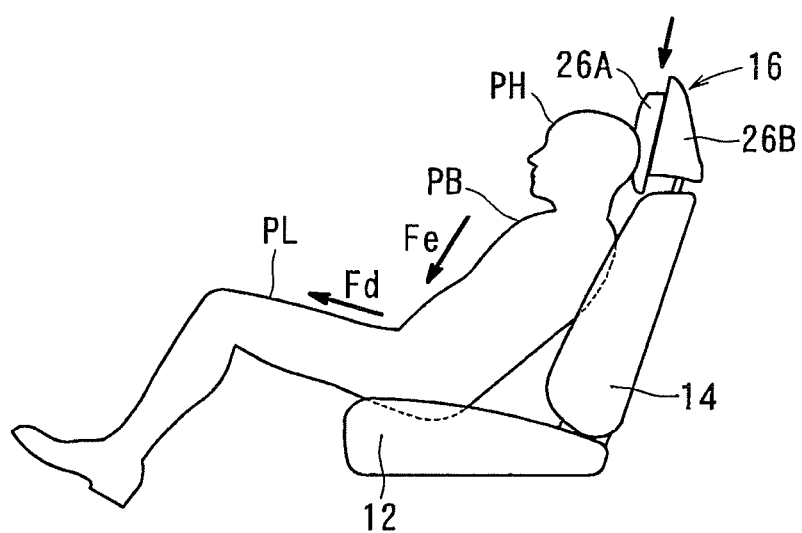
FIG. 21 is a side view of the vehicle seat and the user when the user moves downwards further at the time of the rearward collision.

As shown in FIGS. 17 to 21, when rearward collision occurs, the body PB may move downwards. As shown in FIGS. 17 and 18, when rearward collision occurs, the head PH moves backwards, and is pressed against the front pad 26A. As shown in FIG. 19, the waist of the user P is pressed against the seatback 14, and the waist of the user P is propelled forward due to the elastic force of the seatback 14. As a result, the waist receives a forward force Fd, and moves forwards as shown in FIG. 20. The body PB of the user P moves downwards.

If the front pad 26A cannot move as in the prior art, the head PH of the user P receives a force Rd, and rotates forwards. Thus, a large burden may be applied to the neck of the user P. In contrast, the front pad 26A can move with respect to the rear pad 26B. When the body PB moves downwards, the head PH moves downwards together with the front pad 26A. As a result, it is possible to suppress the forward rotation of the head PH due to the force Rd. As a result, it is possible to suitably suppress the occurrence of whiplash with respect to the user P.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

As described above, only the connection portion 28C may be formed of a member subject to elastic deformation in the headrest cover 28. Alternatively, other members in the headrest cover 28, such as the cover front surface 28A and/or the cover rear surface 28B, may be subject to elastic deformation. For example, the entire headrest cover 28 may be formed of a member (elastic region) subject to elastic deformation.

As described above, the entire connection portion 28C may be formed of a member(s) subject to elastic deformation. Alternatively, only a part of the connection portion 28C may be formed of a member subject to elastic deformation. As described above, the connection portion 28C may be preferably astride the boundary between the front pad 26A and the rear pad 26B. Alternatively, the connection portion 28C may be situated in a different region.

As described above, the seat may be provided in a car. Alternatively, the seat may be provided in a vehicle flying through the air such as an airplane or helicopter, or in a vehicle moving on the sea or under the sea such as a ship or a submarine.

The elastic members 34 and 37 may be rubber bands as described above. Alternatively, the elastic members 34 and 37 may be coil springs, cylinders or the like. The elastic member 34 may extend over the entire periphery of the headrest as the connection portion 28C. Alternatively, the elastic member 34 may be provided in a region in the peripheral direction of the headrest. The headrest 16 may have both or one of the elastic members 34 and 37.

As described above, the headrest 16 may be connected to the seatback 14. Alternatively, the headrest 16 may be connected to a vehicle body such as a wall or a roof. The walls may define a vehicle compartment. The headrest may be connected to something such as the wall of a truck. The headrest may be connected to the roof via a bar hung on the roof.

As shown in FIG. 15, when the rearward collision occurs, the body PB of the user P may receive an upward force Fc. One of the reasons is that when the rearward collision occurs, the body PB pushes the seatback 14 due to an inertial force and the seatback 14 reclines. On the other hand, the head of the user P is kept at the same height. Thus, the body PB receives an upward force Fc.

What is claimed is:

1. A vehicle seat comprising:
   a seatback; and
   a headrest including:
   a first headrest portion connected to one of the seatback and a vehicle body, the first headrest portion comprising a headrest stay and a rear pad mounted to the headrest stay;
   a second headrest portion provided on the first headrest portion so as to be vertically moveable, the second headrest portion provided nearer to a seat occupant side of the seatback than the first headrest portion,
   a headrest cover configured to cover the first headrest portion and the second headrest portion, the headrest cover having an elastic region so that when the second headrest portion moves vertically with respect to the first headrest portion, the elastic region is deformed so as to allow movement of the second headrest portion, and
   an elastic member connected to the headrest stay and configured to connect the first headrest portion and the second headrest portion, wherein
   during a collision when a vertical force is applied to the second headrest portion, the second headrest portion moves vertically relative to the first headrest portion independently of the seatback, and
   the elastic member undergoes elastic deformation when the second headrest portion moves with respect to the first headrest portion.

2. The vehicle seat of claim 1, wherein the headrest cover comprises:
a cover rear surface configured to cover the first headrest portion;
a cover front surface configured to cover the second headrest portion; and
a connection portion configured to cover an area between the cover rear surface and the cover front surface, the connection portion having the elastic region.

3. The vehicle seat of claim 2, wherein the elastic region is provided over one of a portion of the connection portion and the entire area of the connection portion.

4. The vehicle seat of claim 1, wherein the elastic region spans a boundary between the first headrest portion and the second headrest portion.

5. The vehicle seat of claim 1, wherein
the second headrest portion comprises a front pad and a support member mounted to the front pad, and
the elastic member is further connected to the support member.

6. The vehicle seat of claim 1, wherein the elastic member is situated in a region covered by the headrest cover.

7. A vehicle seat comprising:
a seatback; and
a headrest including:
a first headrest portion connected to one of the seatback and a vehicle body;
a second headrest portion provided on the first headrest portion so as to be vertically moveable, the second headrest portion provided nearer to a seat occupant side of the seatback than the first headrest portion,
a headrest cover configured to cover the first headrest portion and the second headrest portion, the headrest cover having an elastic region so that when the second headrest portion moves vertically with respect to the first headrest portion, the elastic region is deformed so as to allow movement of the second headrest portion,
an elastic member provided in an upper portion of the headrest and configured to connect the first headrest portion and the second headrest portion, and
a second elastic member provided in a lower portion of the headrest, the second elastic member is configured to connect the first headrest portion and the second headrest portion, wherein
during a collision when a vertical force is applied to the second headrest portion, the second headrest portion moves vertically relative to the first headrest portion independently of the seatback, and
the elastic member and the second elastic member undergo elastic deformation when the second headrest portion moves with respect to the first headrest portion.

8. A vehicle seat comprising:
a seatback; and
a headrest including:
a first headrest portion connected to one of the seatback and a vehicle body;
a second headrest portion provided on the first headrest portion so as to be vertically moveable, the second headrest portion provided nearer to a seat occupant side of the seatback than the first headrest portion, the second headrest portion comprising a front pad and a support member mounted to the front pad,
a headrest cover configured to cover the first headrest portion and the second headrest portion, the headrest cover having an elastic region so that when the second headrest portion moves vertically with respect to the first headrest portion, the elastic region is deformed so as to allow movement of the second headrest portion, and
an elastic member connected to the support member and configured to connect the first headrest portion and the second headrest portion, wherein
during a collision when a vertical force is applied to the second headrest portion, the second headrest portion moves vertically relative to the first headrest portion independently of the seatback,
the elastic member undergoes elastic deformation when the second headrest portion moves with respect to the first headrest portion, and
the elastic member is wrapped around the support member.

9. A vehicle seat comprising:
a seatback; and
a headrest having:
a first headrest portion connected to one of the seatback and a vehicle body;
a second headrest portion provided on the first headrest portion so as to be vertically movable, the second headrest portion being provided nearer to a seat occupant side of the seatback than the first headrest portion;
a first elastic member provided in an upper portion of the headrest, the first elastic member being configured to connect the first headrest portion and the second headrest portion, the first elastic member undergoes elastic deformation when the second headrest portion moves with respect to the first headrest portion; and
a second elastic member provided in a lower portion of the headrest, the second elastic member being configured to connect the first headrest portion and the second headrest portion, the second elastic member undergoes elastic deformation when the second headrest portion moves with respect to the first headrest portion.

10. The vehicle seat of claim 9, wherein the headrest comprises a headrest cover configured to cover the first headrest portion and the second headrest portion, the headrest cover having an elastic region so that when the second headrest portion moves vertically with respect to the first headrest portion, the elastic region is deformed so as to allow movement of the second headrest portion.

11. A vehicle seat comprising:
a seatback; and
a headrest having:
a first headrest portion connected to one of the seatback and a vehicle body;
a second headrest portion provided on the first headrest portion so as to be vertically movable, the second headrest portion being provided nearer to a seat occupant side of the seatback than the first headrest portion;
a first elastic member provided in a first portion of the headrest, the first elastic member being configured to connect the first headrest portion and the second headrest portion, the first elastic member undergoes elastic deformation when the second headrest portion moves with respect to the first headrest portion; and
a second elastic member provided in a second portion of the headrest, the second elastic member being configured to connect the first headrest portion and the second headrest portion, the second elastic member undergoes elastic deformation when the second headrest portion moves with respect to the first headrest portion.

12. The vehicle seat of claim 11, wherein the second portion of the headrest is located at an opposite side of the first portion of the headrest.

13. The vehicle seat of claim 11, wherein the headrest comprises a headrest cover configured to cover the first headrest portion and the second headrest portion, the headrest cover having an elastic region so that when the second headrest portion moves vertically with respect to the first headrest portion, the elastic region is deformed so as to allow movement of the second headrest portion.

\* \* \* \* \*